(12) United States Patent
Almalki

(10) Patent No.: US 8,872,363 B2
(45) Date of Patent: Oct. 28, 2014

(54) VEHICLE MOVEMENT ACTIVATED ELECTRICAL POWER GENERATOR, AND METHOD FOR PROVIDING ELECTRICAL POWER FOR ROADSIDE APPLICATIONS

(76) Inventor: Bader Abdullah Almalki, Kissimmee, FL (US)

(*) Notice: Subject to any disclaimer, the term of this patent is extended or adjusted under 35 U.S.C. 154(b) by 265 days.

(21) Appl. No.: 13/469,827

(22) Filed: May 11, 2012

(65) Prior Publication Data

US 2013/0300132 A1    Nov. 14, 2013

(51) Int. Cl.
*F03G 7/08*    (2006.01)

(52) U.S. Cl.
USPC .......................................... 290/1 R

(58) Field of Classification Search
USPC ............................ 290/1 R, 44, 55
See application file for complete search history.

(56) References Cited

U.S. PATENT DOCUMENTS

| | | | |
|---|---|---|---|
| 1,950,993 | A | 3/1934 | Mulvey |
| 3,885,163 | A | 5/1975 | Toberman |
| 4,250,395 | A | 2/1981 | Lundgren |
| 4,339,920 | A | 7/1982 | Le Van |
| 4,614,875 | A | 9/1986 | McGee |
| 6,734,575 | B2 | 5/2004 | Ricketts |
| 7,098,553 | B2 | 8/2006 | Wiegel et al. |
| 7,193,332 | B2 | 3/2007 | Spinelli |
| 7,427,173 | B2 | 9/2008 | Chen |
| 7,432,607 | B2 | 10/2008 | Kim et al. |
| 7,589,428 | B2 | 9/2009 | Ghassemi |
| 7,902,690 | B1 | 3/2011 | Van Meveren et al. |
| 7,964,984 | B2 | 6/2011 | Saavedra |
| 8,328,499 | B2 * | 12/2012 | Mauro et al. ...................... 415/1 |
| 2007/0089651 | A1 * | 4/2007 | Pandey ......................... 110/234 |
| 2010/0217550 | A1 * | 8/2010 | Crabtree et al. ................ 702/62 |
| 2011/0006540 | A1 | 1/2011 | Ignatiev et al. |
| 2011/0006603 | A1 * | 1/2011 | Robinson et al. ............... 307/31 |
| 2011/0187125 | A1 | 8/2011 | Jang |

(Continued)

FOREIGN PATENT DOCUMENTS

EP    2 065 596 A1    6/2009
WO    WO 2005/056926 A1    6/2005

OTHER PUBLICATIONS

Joshua Prok, "Interstate Wind: Using New Technology to Enhance Transportation Fuel Investments;" Jun. 19, 2008; Transportation Law Journal; vol. 35:1, pp. 64-83.

*Primary Examiner* — Jean F Duverne
(74) *Attorney, Agent, or Firm* — Oblon, Spivak, McClelland, Maier & Neustadt, L.L.P.

(57) ABSTRACT

Electrical power generation from vehicle movement where there is limited or no access to a power grid. A turbine disposed alongside, above, or under the road, harnesses the wind currents generated by a vehicle to drive an electrical power generator connected to a local electrical power system providing electrical power for roadside devices on the road ahead. Alternatively, pedals may be disposed on the road such that when a vehicle runs over them, the vertical motion of the pedals is translated into a rotational motion to drive an electrical power generator. The local electrical power system is used to supply power for roadside LEDs placed along the road ahead of the vehicle to illuminate the boundaries and perimeter, or for a roadside sign, camera, or deer whistle. The activation of the roadside devices is controlled based on whether it is day or night and the remaining charge of a battery.

14 Claims, 7 Drawing Sheets

(56) References Cited

U.S. PATENT DOCUMENTS

| | | | |
|---|---|---|---|
| 2012/0029853 A1* | 2/2012 | Baumheinrich et al. | 702/65 |
| 2012/0029897 A1* | 2/2012 | Cherian et al. | 703/18 |
| 2012/0066604 A1* | 3/2012 | Vasudevarao et al. | 715/735 |
| 2012/0143565 A1* | 6/2012 | Graham et al. | 702/181 |
| 2012/0150361 A1* | 6/2012 | Lazaris | 700/297 |
| 2012/0151240 A1* | 6/2012 | Robinson et al. | 713/340 |
| 2012/0253532 A1* | 10/2012 | McMullin et al. | 700/291 |
| 2012/0253996 A1* | 10/2012 | Bernardy et al. | 705/28 |

* cited by examiner

| | Day/Night | Roadside Sign | Deer Whistle | Roadside LED |
|---|---|---|---|---|
| Capacity > 75% | Day | OFF | ON | OFF |
| | Night | ON | ON | ON |
| 50% < Capacity ≤ 75% | Day | OFF | ON | OFF |
| | Night | OFF | ON | ON |
| 25% < Capacity ≤ 50% | Day | OFF | ON | OFF |
| | Night | OFF | OFF | ON |
| Capacity < 25% | Day | OFF | OFF | OFF |
| | Night | OFF | OFF | OFF |

FIG. 6

VEHICLE MOVEMENT ACTIVATED ELECTRICAL POWER GENERATOR, AND METHOD FOR PROVIDING ELECTRICAL POWER FOR ROADSIDE APPLICATIONS

BACKGROUND

1. Grant of Non-Exclusive Right

This application was prepared with financial support from the Saudi Arabian Cultural Mission, and in consideration therefore the present inventor has granted The Kingdom of Saudi Arabia a non-exclusive right to practice the present invention.

2. Field of the Disclosure

This disclosure relates to local electrical power generation from vehicle movement, and more specifically, to local electrical power generation from vehicle movement to provide roadside information on the road ahead of a vehicle.

3. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present invention.

Generating electrical power from vehicle movement has been the subject of ongoing efforts. Moving automobile traffic generates wind currents which can be harnessed to drive a turbine and generate electricity. Alternatively or additionally, the weight of moving vehicles can be used in a pressing mechanism, and this pressing mechanism can be translated into a rotational mechanism to drive a turbine and generate electricity.

SUMMARY

Lack of access to an electrical grid in remote roads prohibits sufficient use of road illumination and other roadside applications. This disclosure describes a method and apparatus for local electrical power generation from vehicle movement where there is limited or no access to a power grid. The term "local" refers to an isolated power system that serves as a power supply for a specific application. Turbines disposed alongside, above, or under the road, use the wind currents generated by a vehicle to run an electrical power generator connected to a local electrical power system providing electrical power for roadside applications on the road ahead of a moving vehicle. Alternatively, pedals may be disposed on the road such that when a vehicle passes over them, the vertical motion of the pedals, and the associated force, are translated into a rotational motion to drive an electrical power generator. The local electrical power system may be used to supply power for roadside LEDs placed along the road ahead of the vehicle to illuminate the boundaries and perimeter of the road. The local electrical power system may also be used for other applications such as a roadside sign, a deer whistle, or a camera.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a preferred embodiment of a look up table saved on a static storage device and used to control a local electrical power system.

DETAILED DESCRIPTION OF THE EMBODIMENTS

Figure 1:
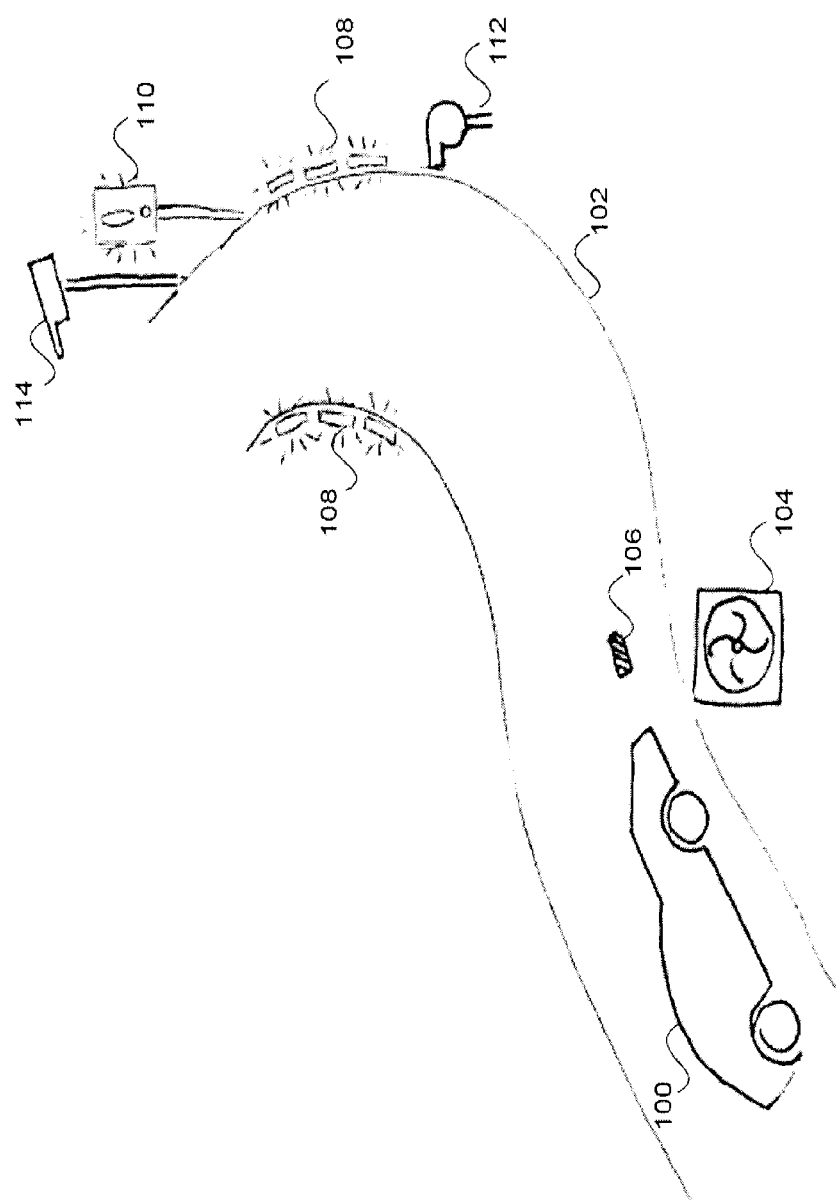
FIG. 1 is a perspective view of a remote road with electrical applications on the road ahead of a vehicle.

Referring now to the drawings, wherein like reference numerals designate identical or corresponding parts throughout the several views, FIG. 1 is an illustrative view of a remote road 102 with electrical devices on or adjacent to the road ahead of a vehicle 100. The vehicle 100 is shown to pass by a turbine 104 and/or over a pedal 106. The turbine 104 and the pedal 106 are properly coupled with a generator (described later in FIG. 5) to generate electrical power. The turbine 104 may be a commercially available wind turbine such as "Lionel Operating Wind Turbine" from Lionel. The pedal 106 may be mechanically coupled with a commercially available bicycle dynamo generator such as "X Factor 3-Inch Generator Light Set" from X Factor.

Alternatively, a plurality of turbines and/or pedals may be used to generate electrical power. The turbines may be disposed alongside, above, or under the road 102.

The generated electrical power is used to supply power for a number of electrical devices on the road ahead of the vehicle, such as roadside LEDs 108 to illuminate the boundary and perimeter of the road ahead of the vehicle, a roadside sign 110, a camera 114, or a deer whistle 112. The LEDs 108 may be disposed on the road surface with an upper display surface exposed. Alternatively, the LEDs 108 may be mounted on a structure built along the road, with a side display surface facing the road. The LEDs 108 may be placed more condensed on the curved portions of the road, and less condensed on the flat portions of the road. The deer whistle 112 may be a commercially available deer whistle such as "Portable Electronic Deer Alert Warning Whistle" from AAA Communications.

Figure 2:
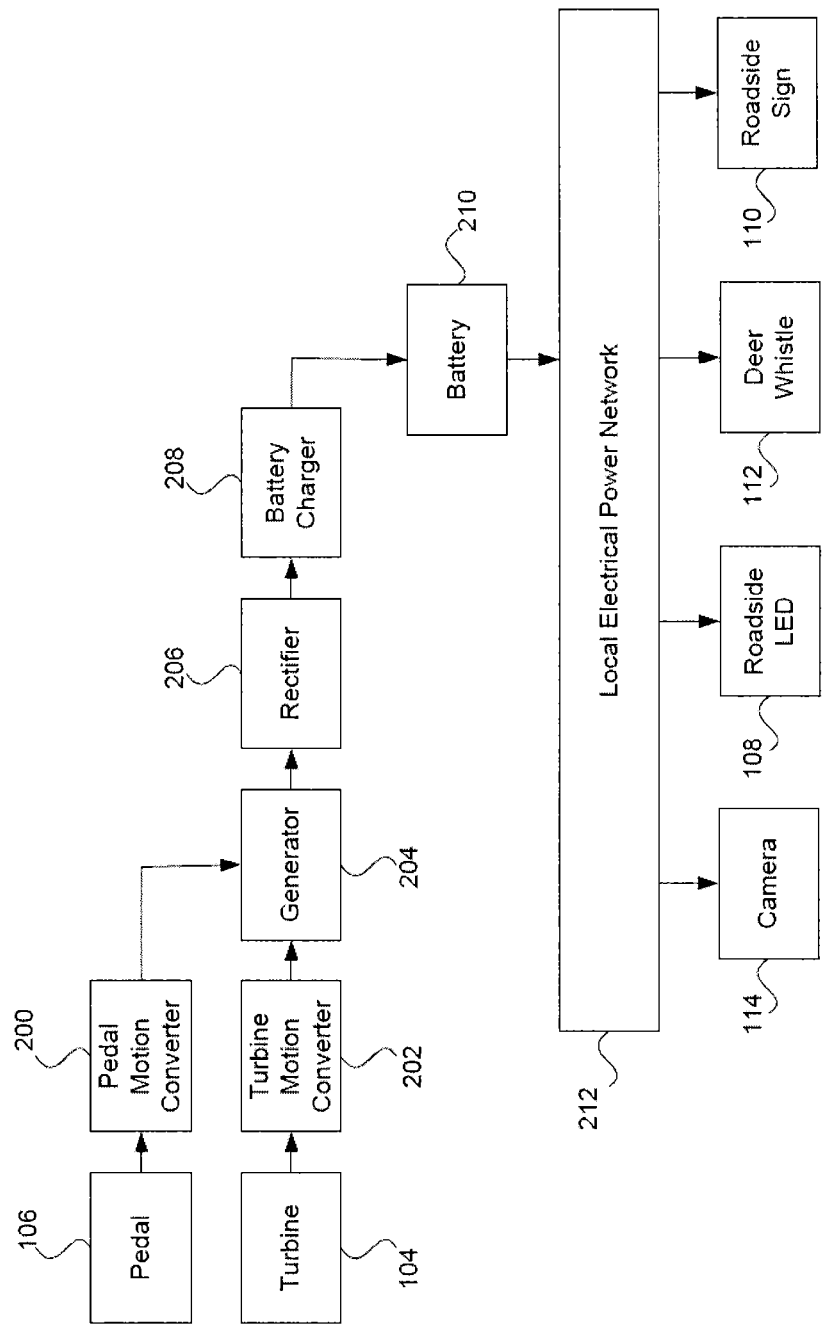
FIG. 2 is a system block diagram of a preferred embodiment of a local electrical power system.

FIG. 2 is a system block diagram of a local electrical power system. The pedal 106 and the turbine 104 are coupled with a pedal motion converter 200 and a turbine motion converter 202 respectively. The pedal motion converter 200 converts the vertical motion of the pedal into a rotational motion. The turbine motion converter 202 converts the rotational motion of the turbine into a rotational motion at a faster Rotations Per Minute (RPM) rate. Both the pedal motion converter 200 and the turbine motion converter 202 are coupled with a generator 204 such that when the pedal 106 is pressed or when the turbine 104 rotates, the generator 204 generates electricity. The pedal 106 and the turbine 104 may alternatively be coupled with separate generators.

The electricity generated by the generator 204 is rectified by a rectifier 206. The rectifier 206 may be a diode bridge. The output of the rectifier 206 is connected to the input of a battery charger 208 which charges a battery 210. The battery 210 is connected to a local electrical power system 212. The local electrical power system 212 provides power for electrical devices on the road ahead of a moving vehicle.

The aforementioned method of providing electricity to be used in front of a vehicle is particularly beneficial in remote roads where there is no access to an electrical power grid. Such method of locally providing electricity makes it possible to activate roadside safety and information devices to aid the driver on the road ahead.

Figure 3:
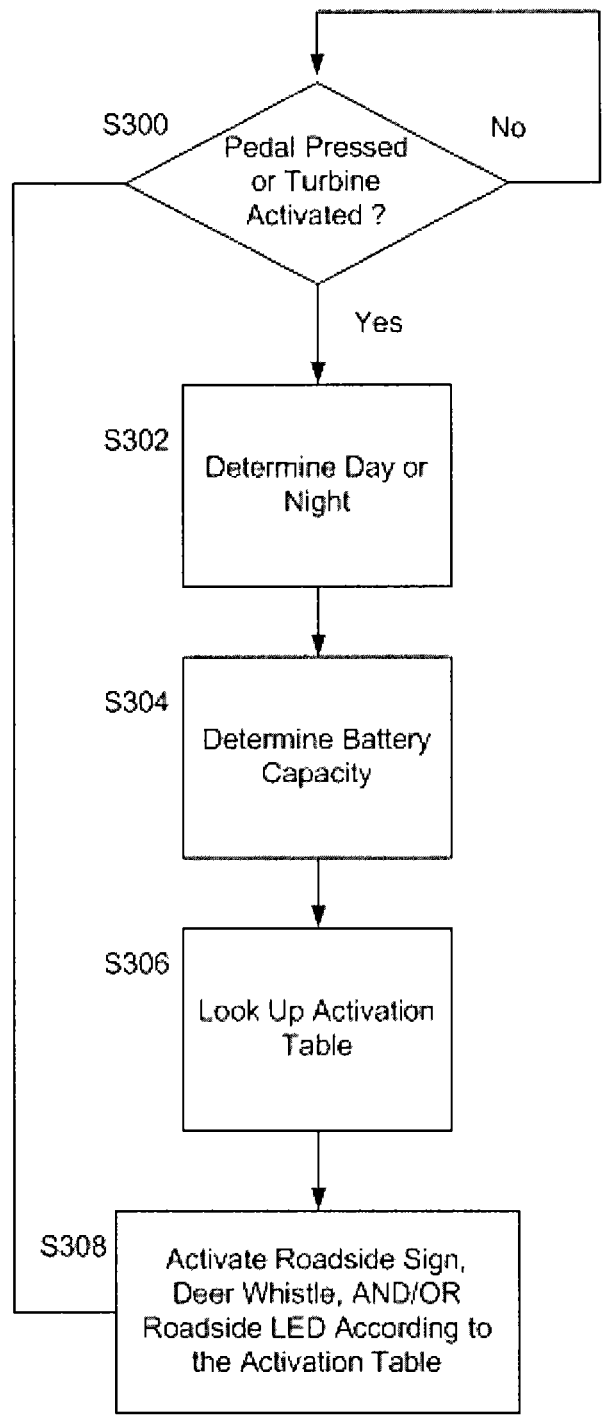
FIG. 3 is a flowchart of a preferred embodiment of a method of controlling a local electrical power system.

FIG. 3 is a flowchart of a method of controlling a local electrical power system. The process begins in step S300 which is a waiting state where the system waits for a pedal to be pressed and/or a turbine to be activated. Once it is determined that a pedal is pressed or a turbine is activated, the process proceeds to step S302 where it is determined, according to a clock or a light sensor, whether it is day time or night time. Then in step S304 the remaining charge of a battery providing power to the local electrical power system is checked. In step S306, based on the outcome of the determinations in steps S302 and S304, a look up table is checked to determine the roadside devices to be activated in front of the vehicle. In step S308, roadside devices are activated according to the outcome of step S306, and the process returns to the waiting state in step S300.

Figure 4:
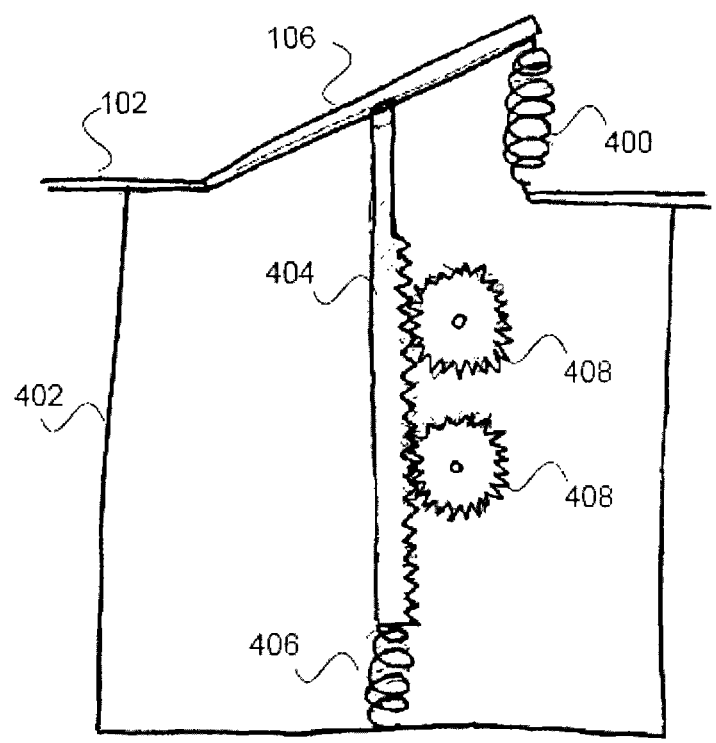
FIG. 4 is an illustrative view of a preferred embodiment of a pedal on the road to convert a pressing mechanism into a rotational mechanism.

FIG. 4 is an illustrative view of a pedal 106 on the road to convert a pressing mechanism into a rotational mechanism. A conduit 402 is disposed under the pedal 106. A first spring 400, when in its relaxed state, holds the pedal 106 protruding upward on the road 102. The pedal is pivotally connected to the upper end of a lever 404. The lever 404 is vertically positioned within the conduit 402. The lower end of the lever 404 is attached to the bottom surface of the conduit 402 by a second spring 406 such that the lever 404 is held vertically when the first spring 400 and the second spring 406 are in their relaxed state.

When a vehicle passes over the pedal 106, the pedal 106 is pressed, forcing the first spring 400 into a pressed state. The movement of the pedal 106 forces the lever 404 downward, which in turn forces the second spring 406 into a pressed state. After the vehicle weight is removed from the pedal 106, the first spring 400, and the second spring 406 move back to their relaxed state. The transition of the first spring 400 and the second spring 406 into a pressed state and then back into a relaxed state causes the lever 404 to move downward and then upward. The lever has a threaded surface adapted to a threaded perimeter of a plurality of wheels 408 placed next to the lever 404, such that the downward and upward movement of the lever 404 causes the plurality of wheels 408 to rotate, thereby translating the vertical movement of the pedal 106 into a rotational movement.

The downward force of the pedal may also be used to turn a fly wheel, which in turn drives a rotor in a winding to provide a sustained electrical current.

Figure 5:
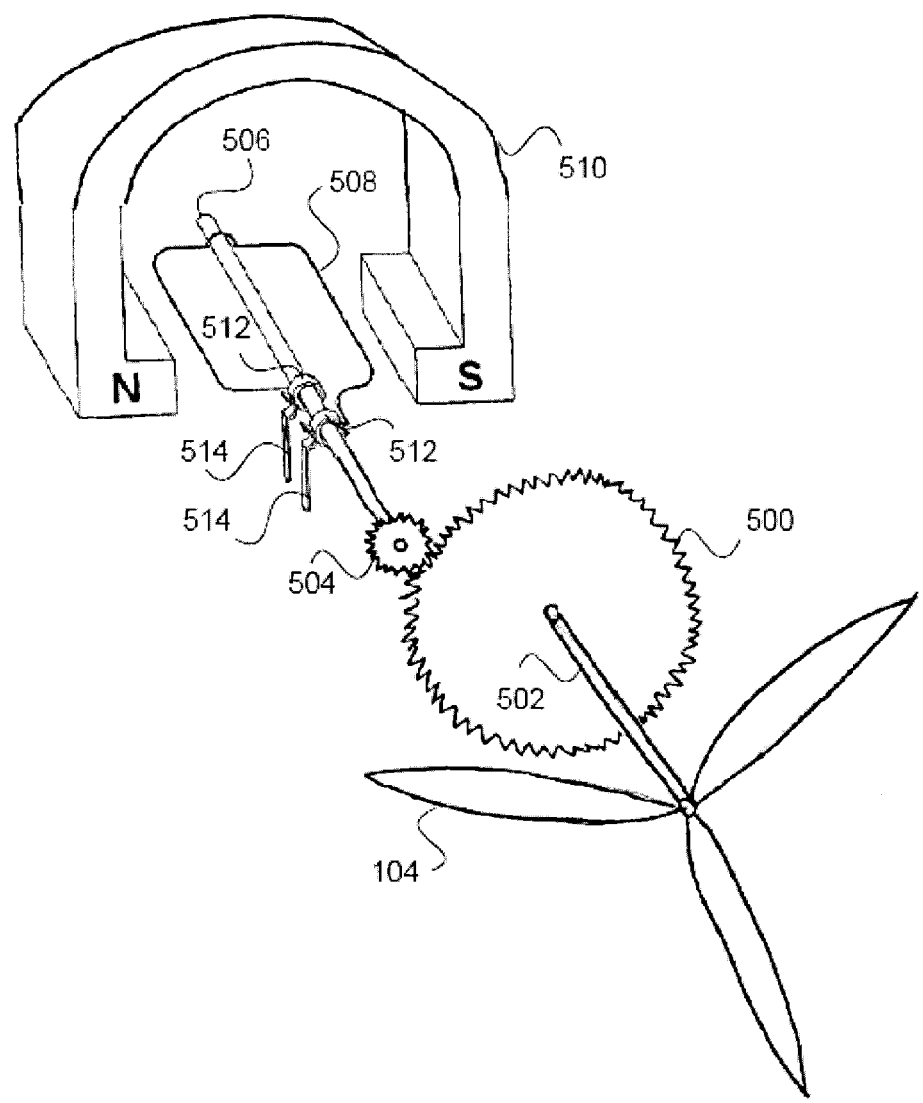
FIG. 5 is an illustrative view of a preferred embodiment of a turbine connected to a generator.

FIG. 5 is a perspective view of a turbine connected to a generator. The turbine 104 is connected to a wide gear wheel 500 by a turbine shaft 502. The wide gear wheel has a toothed perimeter. A narrow gear wheel 504 is in contact with the wide gear wheel 500. The narrow gear wheel 504 has a toothed perimeter that meshes with the toothed perimeter of the wide gear wheel 500. The narrow gear wheel is connected to a generator shaft 506. A wire loop 508 is attached to the generator shaft 506. A horseshoe magnet 510 (or a stator with windings) surrounds the wire loop 508. The wire loop 508 has a conductive loop 512 on each of its two ends. Each conductive loop 512 is in contact with a conductive brush 514. When the turbine 104 rotates, the wide gear wheel 500 rotates, causing the narrow gear wheel 504, the generator shaft 506, and the wire loop 508 to rotate at a faster RPM. The rotation of the wire loop 508 within the horseshoe magnet 510 induces alternating electric current between the conductive loops 512. This alternating current is transferred to a rectifier via the conductive brushes 514.

FIG. 6 is a look up table saved on a static storage device and used to control a local electrical power generation system. This table may be used by a local electrical power system controller to control the electrical roadside devices. The first column from the left indicates the battery capacity which is the amount of electrical charge left on the battery. The second column from the left indicates whether it is day time or night time. The top row indicates the roadside electrical applications. As an example, according to the last two rows of the look up table, when the battery capacity is less than 25%, irrespective of the time of the day, none of the electrical devices will be turned ON. Also, it can be seen throughout the look up table that the roadside sign and the LEDs are always OFF during day time, irrespective of the battery capacity.

Figure 7:
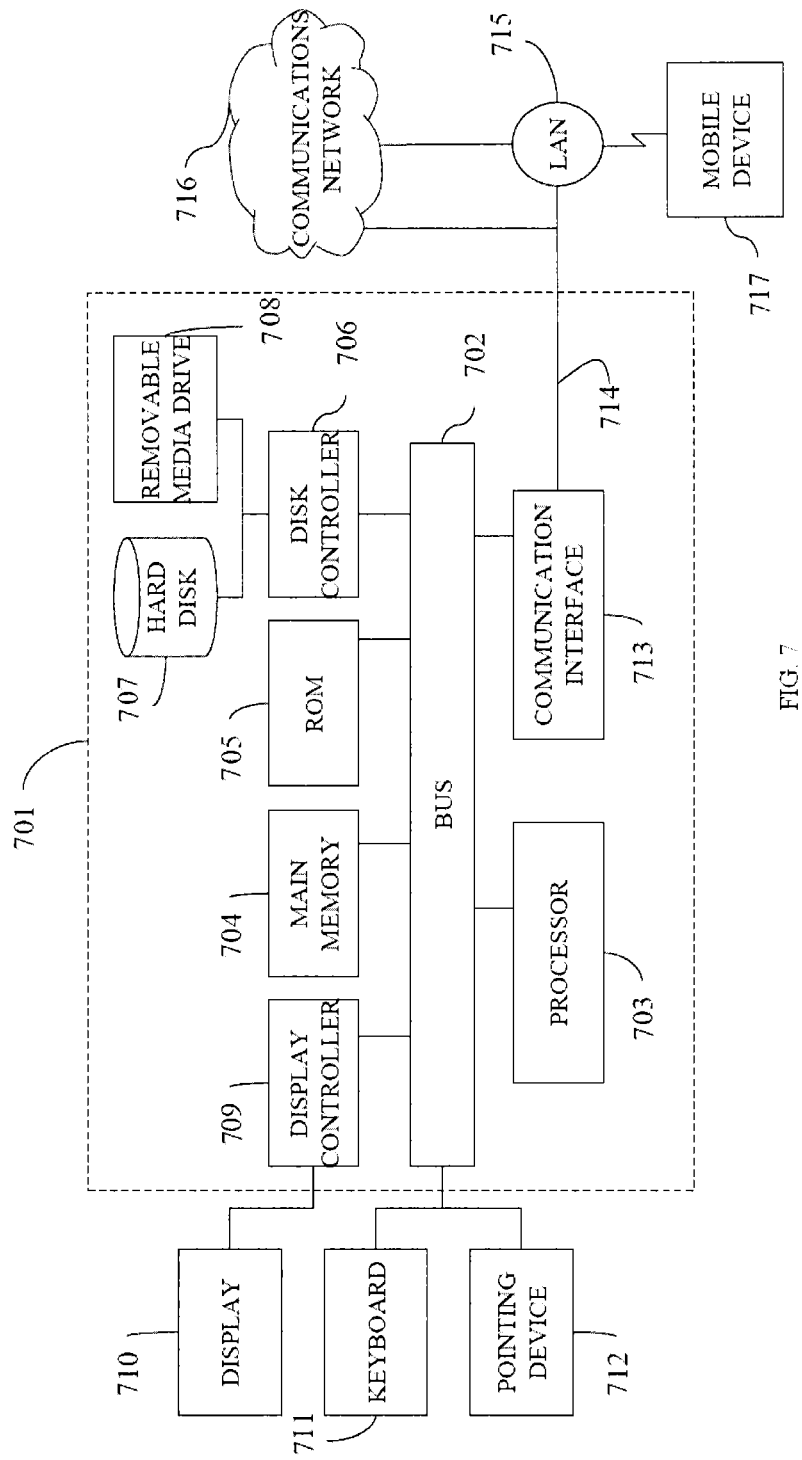
FIG. 7 illustrates a computer system upon which an embodiment of a controller for controlling the local electrical power system may be implemented.

FIG. 7 illustrates a computer system 701 upon which an embodiment of a controller for controlling the local electrical power system may be implemented. The computer system 701 includes a bus 702 or other communication mechanism for communicating information, and a processor 703 coupled with the bus 702 for processing the information. The computer system 701 also includes a main memory 704, such as a random access memory (RAM) or other dynamic storage device (e.g., dynamic RAM (DRAM), static RAM (SRAM), and synchronous DRAM (SDRAM)), coupled to the bus 702 for storing information and instructions to be executed by the processor 703. In addition, the main memory 704 may be used for storing temporary variables or other intermediate information during the execution of instructions by the processor 703. The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 701 may also include a display controller 709 coupled to the bus 702 to control a display 710, such as a cathode ray tube (CRT), for displaying information to a computer user. The computer system includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display

710. In addition, a printer may provide printed listings of data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 701, for driving a device or devices for implementing the invention, and for enabling the computer system 701 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 703 for execution. A computer readable medium may take many forms, including but not limited to, non-volatile media, volatile media, and transmission media. Non-volatile media includes, for example, optical, magnetic disks, and magneto-optical disks, such as the hard disk 707 or the removable media drive 708. Volatile media includes dynamic memory, such as the main memory 704. Transmission media includes coaxial cables, copper wire and fiber optics, including the wires that make up the bus 702. Transmission media also may also take the form of acoustic or light waves, such as those generated during radio wave and infrared data communications.

Various forms of computer readable media may be involved in carrying out one or more sequences of one or more instructions to processor 703 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 701 may receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 704, from which the processor 703 retrieves and executes the instructions. The instructions received by the main memory 704 may optionally be stored on storage device 707 or 708 either before or after execution by processor 703.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a network interface card to attach to any packet switched LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A vehicle movement activated electrical power system comprising:
    a turbine that harnesses wind currents generated by a movement of a vehicle on a road, said movement of said vehicle causing said turbine to rotate;
    a generator coupled to the turbine, said generator configured to generate electricity from a rotation of the turbine;
    a self-contained local electrical power network that is not connected to a public utility power grid and is driven by the generator and extending along the road ahead of the turbine and the vehicle;
    a plurality of electrical LED illumination devices connected to the local electrical power network and disposed along an edge of the road ahead of the turbine and the vehicle so as to provide visual guidance of the edge of the road at nighttime;
    a battery connected to the turbine and to the self-contained local electrical power network, said battery configured to be charged by the turbine and to provide primary or supplementary power for the self-contained local electrical power network; and
    a controller connected to said self-contained local electrical power network, said battery, and the plurality of electrical LED illumination devices, said controller including a static data storage device and configured to control an activation state of the plurality of electrical LED illumination devices according to a look up table stored on said static data storage device of said controller, said look up table including activation information used by the controller to control an illumination state of the plurality of electrical LED illumination devices, said activation information including at least one of a time of the day and a remaining charge level of said battery.

2. The system of claim 1, wherein
    the turbine is disposed on, alongside, above, or under the road.

3. The system of claim 1, further comprising
    an additional LED illumination device that illuminates a roadside sign;
    a camera; and
    a deer whistle.

4. The system of claim 1, further comprising
    a deer whistle powered by the self-contained local electrical power network.

5. The system of claim 3, wherein
    when the time of the day is day time and the remaining charge level of said battery is more than a first threshold, the controller sets the additional LED illumination device for the roadside sign and the plurality of electrical LED illumination devices to OFF and the deer whistle to ON;
    when the time of the day is night time and the remaining charge level of said battery is more than the first threshold, the controller sets the additional LED illumination device for the roadside sign, the plurality of electric LED illumination devices, and the deer whistle to ON;
    when the time of the day is day time and the remaining charge level of said battery is more than a second threshold and less than the first threshold, the controller sets the additional LED illumination device for the roadside sign and the plurality of electrical LED illumination devices to OFF and the deer whistle to ON;
    when the time of the day is night time and the remaining charge level of said battery is more than the second threshold and less than the first threshold, the controller sets the additional LED illumination device for the roadside sign to OFF, and the plurality of electrical LED illumination devices and the deer whistle to ON;
    when the time of the day is day time and the remaining charge level of said battery is more than a third threshold and less than the second threshold, the controller sets the additional LED illumination device for the roadside sign and the plurality of electrical LED illumination devices to OFF and the deer whistle to ON;
    when the time of the day is night time and the remaining charge level of said battery is more than the third threshold and less than the second threshold, the controller sets the additional LED illumination device for the roadside sign and the deer whistle to OFF, and the plurality of electrical LED illumination devices to ON; and
    when the remaining charge level of said battery is less than the third threshold, the controller sets the additional LED illumination device for the roadside sign, the plurality of electrical LED illumination devices, and the deer whistle to OFF.

6. A vehicle movement activated electrical power system comprising:
    a pedal disposed on a road, said pedal moving vertically when a vehicle passes over the pedal;
    a motion conversion mechanism connected to the pedal to translate a vertical motion of the pedal into a rotational motion;
    a generator coupled with said rotational motion of said motion conversion mechanism, said generator configured to generate electricity from said rotational motion;
    a self-contained local electrical power network that is not connected to a public utility power grid and is driven by the generator and extending along the road ahead of the turbine and the vehicle;
    a plurality of electrical LED illumination devices connected to the local electrical power network and disposed along an edge of the road ahead of the pedal and the vehicle so as to provide visual guidance on the edge of the road at nighttime;
    a battery connected to the turbine and to the local electrical power network, said battery configured to be charged by the motion conversion mechanism and to provide primary or supplementary power for the self-contained local electrical power network; and
    a controller connected to said self-contained local electrical power network, said battery, and the plurality of electrical LED illumination devices, said controller including a static data storage device and configured to control an activation state of the plurality of electrical LED illumination devices according to a look up table stored on said static data storage device of said controller, said look up table including activation information used by the controller to control an illumination state of the plurality of electrical LED illumination devices, said activation information including at least one of a time of the day and a remaining charge level of said battery.

7. The system of claim 6, wherein
    an additional LED illumination device that illuminates a roadside sign;
    a camera; and
    a deer whistle.

8. The system of claim 6, wherein
a deer whistle powered by the self-contained local electrical power network.

9. The system of claim 7, wherein
when the time of the day is day time and the remaining charge level of said battery is more than a first threshold, the controller sets the additional LED illumination device for the roadside sign and the plurality of electrical LED illumination devices to OFF and the deer whistle to ON;

when the time of the day is night time and the remaining charge level of said battery is more than the first threshold, the controller sets the additional LED illumination device for the roadside sign, the plurality of electric LED illumination devices, and the deer whistle to ON;

when the time of the day is day time and the remaining charge level of said battery is more than a second threshold and less than the first threshold, the controller sets the additional LED illumination device for the roadside sign and the plurality of electrical LED illumination devices to OFF and the deer whistle to ON;

when the time of the day is night time and the remaining charge level of said battery is more than the second threshold and less than the first threshold, the controller sets the additional LED illumination device for the roadside sign to OFF, and the plurality of electrical LED illumination devices and the deer whistle to ON;

when the time of the day is day time and the remaining charge level of said battery is more than a third threshold and less than the second threshold, the controller sets the additional LED illumination device for the roadside sign and the roadside LED plurality of electrical LED illumination devices to OFF and the deer whistle to ON;

when the time of the day is night time and the remaining charge level of said battery is more than the third threshold and less than the second threshold, the controller sets the additional LED illumination device for the roadside sign and the deer whistle to OFF, and the plurality of electrical LED illumination devices to ON; and when the remaining charge level of said battery is less than the third threshold, the controller sets the additional LED illumination device for the roadside sign, the plurality of electrical LED illumination devices, and the deer whistle to OFF.

10. A method of electrical power generation from vehicle movement and application control, the method comprising:
generating electrical power by harnessing wind currents generated by a movement of a vehicle that drives a rotation of a turbine exposed to the wind currents, the turbine being coupled to a generator, the generator generating electricity from the rotation of the turbine;

distributing the generated electrical power along, in, or on the road ahead of the turbine by a self-contained local electrical power network connected to the generator and not connected to a public utility power grid, the self-contained local electrical power network being connected to a plurality of electrical LED illumination devices along an edge of the road ahead of the vehicle, so as to provide visual guidance of the edge of the road at nighttime;

charging a battery with the electrical power generated by the generator;

controlling with a controller the self-contained local electrical power network, the battery, and the plurality of electrical LED illumination devices, said controller accessing a static data storage device and controlling an activation state of the plurality of electrical LED illumination devices according to a look up table stored on said static data storage device, said look up table including activation information used by the controller to control an illumination state of the plurality of electrical LED illumination devices, said activation information being including at least one of a time of the day and a remaining charge level of said battery.

11. The method of claim 10, wherein
the turbine is disposed on, alongside, above, or under the road.

12. The method of claim 10, wherein
an additional LED illumination device that illuminates a roadside sign;
a camera; and
a deer whistle.

13. The method of claim 10, wherein
a deer whistle powered by the self-contained local electrical power network.

14. The method of claim 12, wherein
when the time of the day is day time and the remaining charge level of said battery is more than a first threshold, the controller sets the additional LED illumination device for the roadside sign and the plurality of electrical LED illumination devices to OFF and the deer whistle to ON;

when the time of the day is night time and the remaining charge level of said battery is more than the first threshold, the controller sets the additional LED illumination device for the roadside sign, the plurality of electric LED illumination devices, and the deer whistle to ON;

when the time of the day is day time and the remaining charge level of said battery is more than a second threshold and less than the first threshold, the controller sets the additional LED illumination device for the roadside sign and the plurality of electrical LED illumination devices to OFF and the deer whistle to ON;

when the time of the day is night time and the remaining charge level of said battery is more than the second threshold and less than the first threshold, the controller sets the additional LED illumination device for the roadside sign to OFF, and the plurality of electrical LED illumination devices and the deer whistle to ON;

when the time of the day is day time and the remaining charge level of said battery is more than a third threshold and less than the second threshold, the controller sets the additional LED illumination device for the roadside sign and the plurality of electrical LED illumination devices to OFF and the deer whistle to ON;

when the time of the day is night time and the remaining charge level of said battery is more than the third threshold and less than the second threshold, the controller sets the additional LED illumination device for the roadside sign and the deer whistle to OFF, and the plurality of electrical LED illumination devices to ON; and when the remaining charge level of said battery is less than the third threshold, the controller sets the additional LED illumination device for the roadside sign, the plurality of electrical LED illumination devices, and the deer whistle to OFF.

* * * * *